(12) United States Patent
Ruede et al.

(10) Patent No.: US 11,254,817 B2
(45) Date of Patent: Feb. 22, 2022

(54) POLYURETHANE COMPOSITE MATERIAL, ARTICLE COMPRISING THE MATERIAL AND METHOD OF MANUFACTURE

(71) Applicant: CertainTeed LLC, Malvern, PA (US)

(72) Inventors: Paul Ruede, Brooklyn, MI (US); Choung-Houng Lai, Acton, MA (US); Nicky Chan, Hudson, MA (US); George Atkins Walrath, Jackson, MI (US); Olivia Gady, Northboro, MA (US)

(73) Assignee: CertainTeed LLC, Malvern, PA (US)

( * ) Notice: Subject to any disclaimer, the term of this patent is extended or adjusted under 35 U.S.C. 154(b) by 0 days.

(21) Appl. No.: 16/367,105

(22) Filed: Mar. 27, 2019

(65) Prior Publication Data
US 2019/0300703 A1  Oct. 3, 2019

Related U.S. Application Data

(60) Provisional application No. 62/651,105, filed on Mar. 31, 2018.

(51) Int. Cl.

| | | |
|---|---|---|
| C08L 75/04 | (2006.01) |
| C08K 3/013 | (2018.01) |
| C08K 3/34 | (2006.01) |
| C08K 3/36 | (2006.01) |
| C08K 11/00 | (2006.01) |
| B29C 48/03 | (2019.01) |
| B29C 48/285 | (2019.01) |
| C08K 3/22 | (2006.01) |
| C08K 3/26 | (2006.01) |
| B29C 70/58 | (2006.01) |
| C08K 3/014 | (2018.01) |
| B29K 509/10 | (2006.01) |
| B29K 75/00 | (2006.01) |
| B29K 507/04 | (2006.01) |

(52) U.S. Cl.
CPC .............. *C08L 75/04* (2013.01); *B29C 48/03* (2019.02); *B29C 48/288* (2019.02); *B29C 70/58* (2013.01); *C08K 3/013* (2018.01); *C08K 3/014* (2018.01); *C08K 3/22* (2013.01); *C08K 3/26* (2013.01); *C08K 3/346* (2013.01); *C08K 3/36* (2013.01); *C08K 11/005* (2013.01); *B29K 2075/00* (2013.01); *B29K 2507/04* (2013.01); *B29K 2509/10* (2013.01); *C08K 2003/2272* (2013.01); *C08K 2003/2275* (2013.01); *C08K 2003/265* (2013.01); *C08K 2201/005* (2013.01)

(58) Field of Classification Search
CPC .. C08K 3/013; C08K 3/014; C08K 2003/265; C08K 2003/2265; C08K 2003/2268; C08K 2003/2272; C08K 2003/2275
See application file for complete search history.

(56) References Cited

U.S. PATENT DOCUMENTS

| | | |
|---|---|---|
| 2002/0122929 A1 | 9/2002 | Simpson |
| 2003/0054123 A1 | 3/2003 | Black |
| 2008/0029925 A1 | 2/2008 | Brown |
| 2012/0029145 A1 | 2/2012 | Brown |
| 2015/0267029 A1 | 9/2015 | Hill |
| 2016/0194432 A1 | 7/2016 | Shutov |

FOREIGN PATENT DOCUMENTS

| | | | |
|---|---|---|---|
| CN | 103881549 A | * | 6/2014 |
| CN | 105669117 A | * | 6/2016 |

OTHER PUBLICATIONS

CN 105669117 A machine translation (Jun. 2016).*
CN 103881549 A machine translation (Jun. 2014).*

* cited by examiner

*Primary Examiner* — Ana L. Woodward
(74) *Attorney, Agent, or Firm* — McDonnell Boehnen Hulbert & Berghoff LLP

(57) ABSTRACT

The present disclosure relates generally to polyurethane matrix composite materials, for example, suitable for making an exterior cladding product for houses and other buildings. The present disclosure relates more particularly to a polymer matrix composite material including a polyurethane matrix and an inorganic filler in a range from 45% to 85% by weight of the composite material. The inorganic filler includes a first substance from the group consisting of calcium carbonate, sand, talc, kaolin clay, dolomite, feldspar and mica and any mixture thereof, and fly ash, and/or an iron oxide in a range from 0.5% to 7% by weight of the inorganic filler.

20 Claims, 13 Drawing Sheets

POLYURETHANE COMPOSITE MATERIAL, ARTICLE COMPRISING THE MATERIAL AND METHOD OF MANUFACTURE

CROSS-REFERENCE TO RELATED APPLICATIONS

This application claims the benefit of U.S. Provisional Patent Application No. 62/561,105, filed Mar. 31, 2018, which is hereby incorporated herein by reference in its entirety.

BACKGROUND OF THE DISCLOSURE

1. Field of the Disclosure

The present disclosure relates generally to polyurethane matrix composite materials, for example, suitable for making an exterior cladding product for houses and other buildings. The present disclosure relates more particularly to a polyurethane material with an inorganic filler.

2. Technical Background

Polyurethane matrix composite materials are suitable for a variety of different products. Polyurethane has excellent mechanical properties, which can be further enhanced by a filler distributed through the matrix. Further, for various applications the polyurethane can foamed, making the article lightweight, or unfoamed. Moreover, the articles can be fashioned to a wide variety of shapes for different uses.

Although articles made of polyurethane composites have various advantages, the polyurethane can be susceptible to degradation by ultraviolet (UV) light. The degradation will first manifest as a discoloration or yellowing of the material. More severe degradation may result in cracking of the polyurethane. Accordingly, articles made using polyurethane, particularly those intended for outdoor use, are vulnerable to degradation if they are not protected from UV exposure.

In some polyurethane composite materials, the filler helps to limit the UV degradation. Specifically, the filler material blocks the transmission of UV light through the article, thereby preventing UV degradation of the polyurethane. However, some fillers that have UV blocking characteristics are naturally occurring materials or byproducts of certain processes. The properties of these filler materials can vary such that their suitability in a polyurethane composite material varies from one batch of the filler material to the next. Moreover, many suitable fillers have high or variable costs.

What is needed is a polyurethane matrix composite material that resists UV degradation without requiring substantial increases in cost.

SUMMARY OF THE DISCLOSURE

In one aspect, the present disclosure provides a polymer matrix composite material comprising:
a polyurethane matrix; and
an inorganic filler in a range from 45% to 85% by weight of the composite material, the inorganic filler including:
a first substance selected from the group consisting of calcium carbonate, sand, talc, kaolin clay, dolomite, feldspar and mica or a mixture thereof (e.g., from the group consisting of calcium carbonate, sand, talc and kaolin clay or a mixture thereof), and
an iron oxide in a range from 0.5% to 7% by weight of the inorganic filler.

In another aspect, the present disclosure provides a polymer matrix composite material comprising:
a polyurethane matrix; and
an inorganic filler in a range from 45% to 85% by weight of the composite material, the inorganic filler including:
a first substance selected from the group consisting of calcium carbonate, sand, talc, kaolin clay, dolomite, feldspar and mica or a mixture thereof (e.g., from the group consisting of calcium carbonate, sand, talc and kaolin clay or a mixture thereof), and
fly ash.

In another aspect, the disclosure provides a polyurethane article comprising a body composed of a polymer matrix composite material including:
a polyurethane matrix; and
an inorganic filler in a range from 45% to 85% by weight of the composite material, the inorganic filler including:
a first substance selected from the group consisting of calcium carbonate, sand, talc, kaolin clay, dolomite, feldspar and mica or a mixture thereof (e.g., from the group consisting of calcium carbonate, sand, talc and kaolin clay or a mixture thereof), and
an iron oxide in a range from 0.5% to 7% by weight of the inorganic filler.

In another aspect, the disclosure provides an exterior cladding system comprising:
a wall substrate; and
a plurality of articles according to the disclosure,
wherein each of the articles is formed as an exterior cladding plank and is attached to the wall substrate.

In yet another aspect, the disclosure provides a method of forming a polyurethane article according to the disclosure, the method comprising:
introducing material components of a polyurethane into an extruder;
introducing an inorganic filler into the extruder, the inorganic filler including:
a first substance selected from the group consisting of calcium carbonate, sand, talc, kaolin clay, dolomite, feldspar and mica or a mixture thereof (e.g., from the group consisting of calcium carbonate, sand, talc and kaolin clay and any mixture thereof), and
an iron oxide in a range from 0.5% to 7% by weight of the inorganic filler; and
mixing the material components of the polyurethane and the inorganic filler in the extruder so as to form an article including a polyurethane matrix composite material.

In yet another aspect, the disclosure provides a method of forming a polyurethane article according to the disclosure, the method comprising:
introducing material components of a polyurethane into an extruder;
introducing an inorganic filler into the extruder, the inorganic filler including:
a first substance selected from the group consisting of calcium carbonate, sand, talc, kaolin clay, dolomite, feldspar and mica or a mixture thereof (e.g., from the group consisting of calcium carbonate, sand, talc and kaolin clay and any mixture thereof), and
fly ash; and mixing the material components of the polyurethane and the inorganic filler in the extruder so as to form an article including a polyurethane matrix composite material.

Another aspect of the disclosure is method for providing a polyurethane article comprising measuring the transmittance in the ultraviolet (e.g., at a wavelength in the range of 300 nm to 400 nm, or 320 nm to 380 nm) of a material, and, based on the measured transmittance, including the material as an inorganic filler in a polyurethane article as otherwise described herein.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

Figure 1:
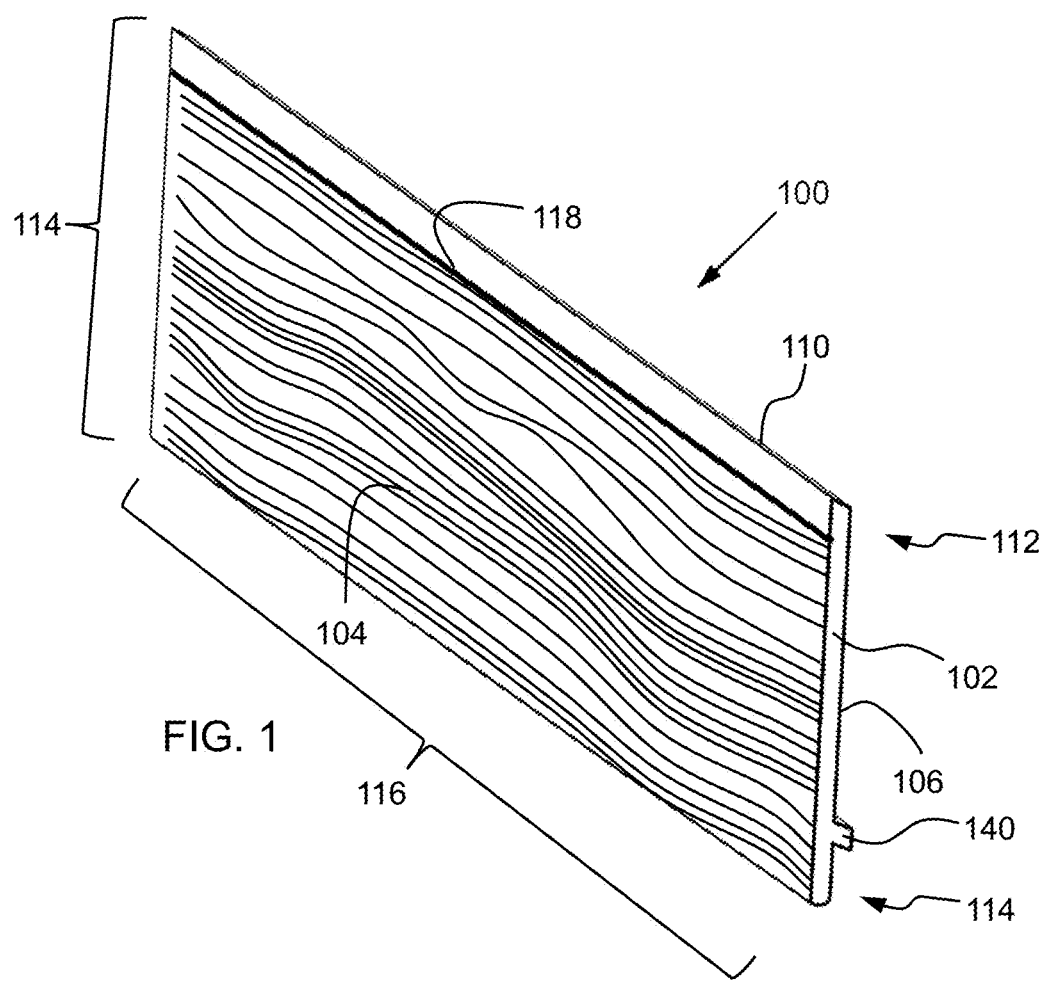
FIG. 1 is a schematic perspective view of an article formed from a polyurethane matrix composite material in accordance with an embodiment of the disclosure.

As described above, the present inventors have noted that conventional fillers in polyurethane matrix composite materials can have unexpected variance in certain important properties. The present inventors have unexpectedly determined that a polyurethane matrix composite material with an inorganic filler including an iron oxide has excellent mechanical properties and UV degradation resistance.

Accordingly, one aspect of the disclosure is a polymer matrix composite material including a polyurethane matrix and an inorganic filler in a range from 45% to 85% by weight of the composite material, where the inorganic filler includes a first substance selected from the group consisting of calcium carbonate, sand, talc, kaolin clay, dolomite, feldspar and mica (e.g., from the group consisting of calcium carbonate, sand, talc and kaolin clay); and an iron oxide in a range from 0.5% to 7% by weight of the inorganic filler. In other embodiments the amount of inorganic filler is in a range of 55% to 85%, 45-75% or 55-75% by weight.

In certain especially desirable embodiments, the first substance provides at least 50% by weight of the inorganic filler. Calcium carbonate, sand, talc and kaolin clay can be advantaged in that they are low cost without sacrificing strength or other mechanical properties. Further, such first substances can often be sourced with a consistent moisture level, which allows for the polyurethane reaction process to be consistent across lots. Dolomite, feldspar and mica can also be advantaged.

In certain embodiments as otherwise described herein, the amount of the first substance in the inorganic filler, by weight, is at least 60%, at least 75%, at least 85%, at least 90%, or even at least 95%. For example, in some embodiments, the inorganic filler includes one or more iron oxides in an amount, by weight, in a range from 0.5% to 7%, optionally one or more additional filler materials (e.g., a fibrous material) in an amount, by weight, in a range from 0% to 20%, and a remainder of the first substance.

However, in other embodiments, the inorganic filler includes additional materials. For example, the inorganic filler can include fly ash. In certain such embodiments, the amount of fly ash in the filler is up to 45%, up to 35%, up to 25%, or up to 15% by weight (e.g., and at least 10 wt %). However, in certain embodiments, there is less than 10 wt %, less than 5 wt %, less than 2 wt % or even less than 1 wt % fly ash in the inorganic filler.

In certain embodiments as otherwise described herein, the first substance comprises (or is at least 90%, or consists of) calcium carbonate. The calcium carbonate can be provided in many forms, and come from many sources, e.g., aragonite, calcite, chalk, limestone, marble and vaterite.

In other embodiments as otherwise described herein, the first substance comprises (or is at least 90%, or consists of) sand. In other embodiments as otherwise described herein, the first substance comprises (or is at least 90%, or consists of) talc. In other embodiments as otherwise described herein, the first substance comprises (or is at least 90%, or consists of) kaolin clay.

In other embodiments as otherwise described herein, the first substance comprises (or is at least 90%, or consists of) dolomite. In other embodiments as otherwise described herein, the first substance comprises (or is at least 90%, or consists of) feldspar. In other embodiments as otherwise described herein, the first substance comprises (or is at least 90%, or consists of) mica.

In certain embodiments as otherwise described herein, an average particle size of the first substance is in a range from 5 µm to 50 µm, e.g., from 8 µm to 20 µm, or from 5 µm to 20 µm, or from 8 µm to 50 µm. The particle size of the inorganic filler, particularly of the first substance therein, can impact the viscosity of the material mixture prior to the polyurethane reaction. For example, as described in more detail below, in some embodiments the filler is mixed with certain material components of the polyurethane prior to the reaction. If the viscosity of this mixture is high, achieving proper mixing of the all of the materials can be unnecessarily difficult.

In addition to average particle size affecting the reaction, the distribution of the particle size can also impact proper mixing and the polyurethane reaction. In some embodiments, the particle size distribution of the calcium carbonate has a D10 in a range from 1 μm to 10 μm, e.g., from 3 μm to 6 μm, from 1 μm to 6 μm, or from 3 μm to 10 μm. Likewise, in some embodiments the particle size distribution of the calcium carbonate has a D90 in a range from 50 μm to 120 μm, e.g., from 70 μm to 100 μm, from 50 μm to 120 μm, or from 70 μm to 120 μm.

Figure 4:
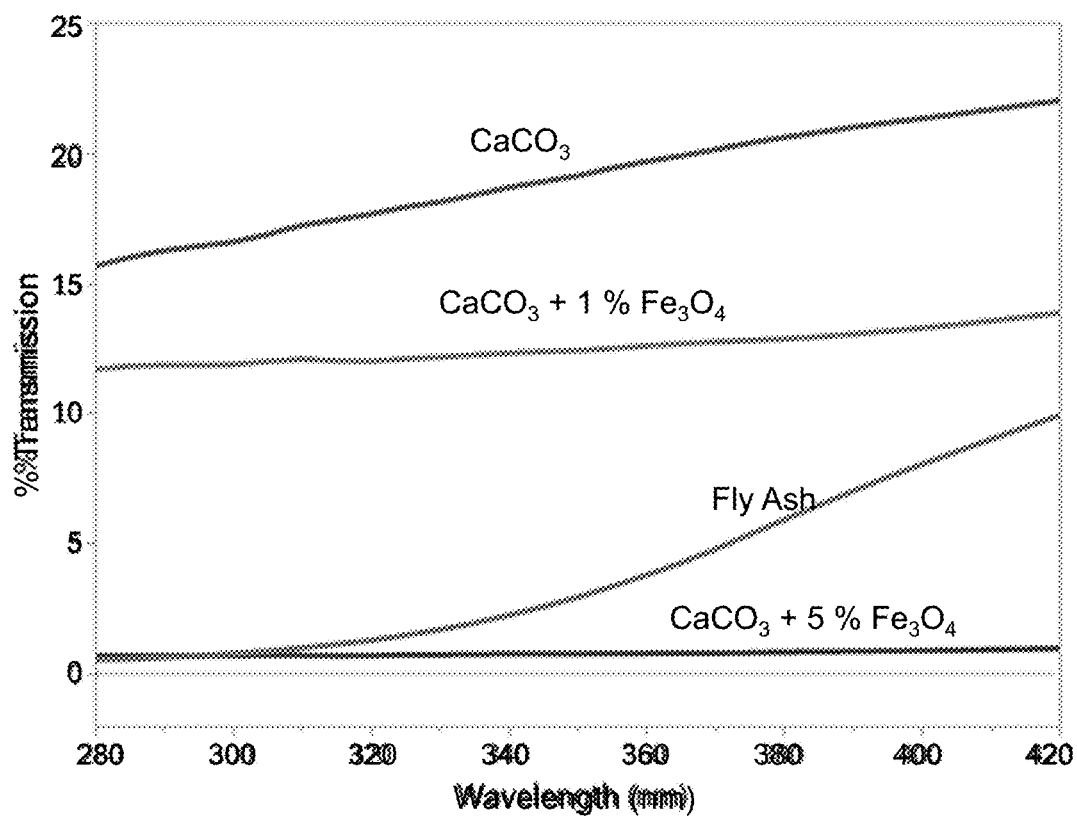
FIG. 4 is a chart illustrating a comparison of UV transmissions of different fillers.

While calcium carbonate, talc, sand and kaolin have many advantageous characteristics for use as a filler, none are exceptional as a UV blocker. Similarly, in other embodiments, dolomite, feldspar and mica can have advantageous characteristics for use as a filler, without being exceptional as a UV blocker. Accordingly, a polyurethane composite that uses such first substances alone may be subject to degradation if exposed to UV light. As set forth above, the inventors have determined that even small amounts of an iron oxide (e.g., less than 10%) to the inorganic filler can significantly hinder the transmission of UV light. The chart in FIG. 4 shows comparative UV transmission through various fillers. Thin disks made of 2% by weight for each of the shown fillers with a remainder of potassium bromide were prepared in a Carver press. UV light transmission properties of the disks were then determined with a UV-Vis spectrophotometer. As the chart demonstrates, calcium carbonate alone allows the transmission of significantly more UV light than conventional fillers, such as fly ash. However, the addition of as little as 1%, by weight, of an iron oxide, in this case $Fe_3O_4$, substantially reduces the transmission of UV light through the sample. Accordingly, the mixture of calcium carbonate and 1% iron oxide is significantly more in line with the conventional fly ash filler, particularly at higher wavelengths, where a primer may be less effective as a UV blocker, as explained above.

The chart further demonstrates that additional iron oxide further limits the transmission of UV light. In particular, the addition of 5% $Fe_3O_4$ limited the transmission of UV light to very low levels across the entire spectrum of UV wavelengths.

In certain embodiments as otherwise described herein, the amount of iron oxide is in a range from 1% to 6% by weight of the inorganic filler, e.g., 3% to 5%, 1% to 5%, 1% to 3%, or 3% to 6% by weight. In certain embodiments as otherwise described herein, the iron oxide includes at least one of $Fe_3O_4$ and $Fe_2O_3$. For example, in some embodiments the filler includes $Fe_3O_4$, magnetite, in a range from 1% to 6%, e.g., 3% to 5%, 1% to 5%, 1% to 3%, or 3% to 6% by weight. In other embodiments, the filler includes $Fe_2O_3$, hematite, in a range from 1% to 6%, e.g., 3% to 5%, 1% to 5%, 1% to 3%, or 3% to 6% by weight. Still in other embodiments the filler includes mixtures of $Fe_3O_4$ and $Fe_2O_3$ having a total weight percent in a range from 1% to 6%, e.g., 3% to 5%, 1% to 5%, 1% to 3%, or 3% to 6% by weight.

In certain embodiments as otherwise described herein, the polyurethane is formed from at least a polyol and an isocyanate. For example, the polyurethane may be formed by the reaction of a mixture including at least one polyol and at least one monomeric or oligomeric poly- or di-isocyanate. Embodiments of a method for facilitating the reaction of the mixture are described in more detail below.

In certain embodiments as otherwise described herein, the mixture includes an oil-based or plant-based polyol. Suitable polyols include but are not limited to polyether polyols, polyester polyols, polycarbonate polyols and polyacrylic polyols. Suitable polyols are commercially available, for example, from Carpenter, Covestro and Dow.

In certain embodiments as otherwise described herein, the mixture includes a monomeric or oligomeric poly- or di-isocyanate. Suitable isocyanates are commercially available, for example, from Covestro, Dow and Huntsman.

In certain embodiments as otherwise described herein, the polyurethane matrix composite material includes a polyurethane foam. Foamed polyurethane matrices offer reduced weight without a substantial loss of strength. In embodiments of the material, the foam includes open cells, closed cells or both open and closed cells.

In certain embodiments as otherwise described herein, the inorganic filler is substantially dispersed throughout the material. For example, in some embodiments, an article formed by the polymer matrix composite material includes the inorganic filler in each portion of the article. In some embodiments, the inorganic filler is evenly dispersed throughout the material. For example, in some embodiments, the concentration, by weight, of inorganic filler in each cubic centimeter of the material may vary by no more than 10%, e.g., no more than 5%. Accordingly, the material may have a substantially similar ratio of inorganic filler and polyurethane matrix throughout.

In certain embodiments as otherwise described herein, the inorganic filler further includes another filler material, e.g., fly ash or a fibrous material. For example, in some embodiments, the weight percentage of the fibrous material in the inorganic filler is in a range from 0% to 20%, e.g., 1% to 20%, or 1 to 10%, or 5% to 20%, or 5% to 10%, or 6% to 8%. A higher concentration of fibrous material is also possible. But in other embodiments, only the first substance and the iron oxide are substantially present in the inorganic filler.

In certain embodiments as otherwise described herein, the fibrous material is a glass fiber. In some embodiments, the glass fibers have an average length in a range of 50 to 250 thousandths of an inch, or in a range of 100 to 200 thousandths of an inch. Other embodiments include other fibrous materials, such as aramid, carbon or basalt fibers. In other embodiments, the fibrous material is composed of wood or paper fibers. Still, in some embodiments, the inorganic filler does not include a fibrous material.

Figure 2:
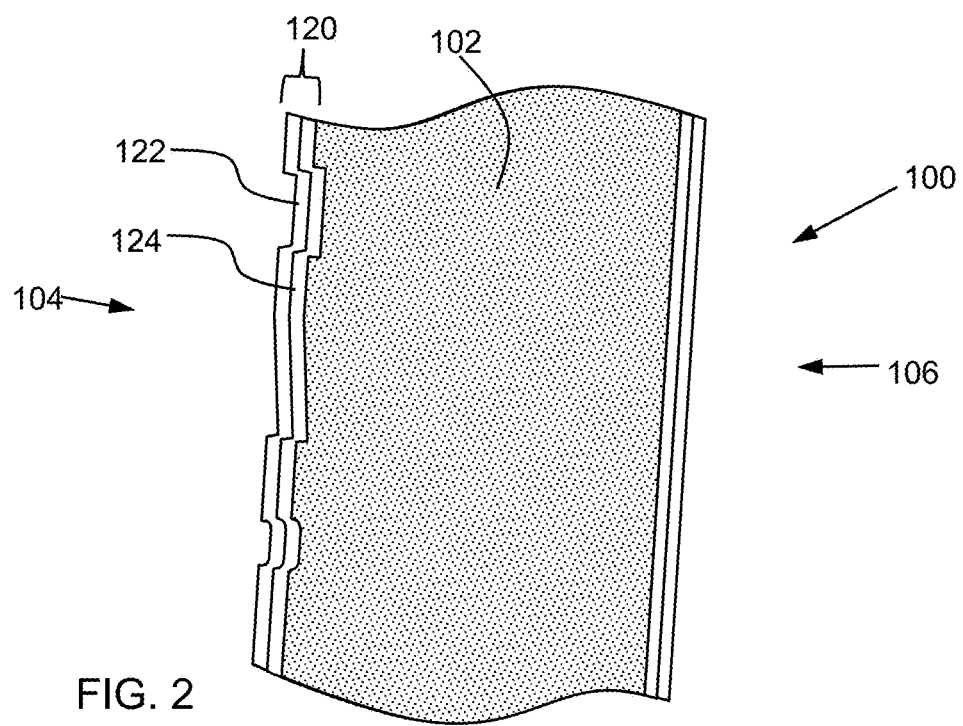
FIG. 2 is a detailed cross sectional view of a section of the article in FIG. 1.

Another aspect of the disclosure provides a polyurethane article comprising a body composed of a polymer matrix composite material according to any of the embodiments described above. Such an article is shown in FIGS. 1 and 2. Article 100 includes a body 102 that is formed of a polyurethane matrix composite material including an inorganic filler comprising 45 to 85% by weight of the total weight of the article. The inorganic filler includes a a first substance from the group consisting of calcium carbonate, sand, talc and kaolin clay and any mixture thereof, and iron oxide which assists with resisting UV degradation. The body 102 of article 100 includes a front surface 104, a rear surface 106, two lateral sides 108, a top edge 110 at an upper end 112 of the body 102 and a lower end 114 of the body. As described in more detail below, article 100 also includes a rear leg 150 protruding outward from rear surface 106.

In certain embodiments as otherwise described herein, the article is in the form of a plank. For example, article 100 is a plank that is substantially planar in shape with a certain thickness that extends across the width 114 (or height) and length 116 of the article. Plank 100 is adapted to cover the exterior surface of the wall of a building, such as a house. The plank acts as an exterior cladding and provides an aesthetic covering of the substrate wall and protects the wall from impacts and other possible damage. In other embodiments, the article includes other cladding material, roofing material, wall panels decking material, doors, window or door frames, synthetic masonry panels, synthetic brick panels, outdoor furniture, or other articles as will be appreciated by those of ordinary skill in the art. In some embodiment, as in article 100, the entire structure of the article is formed of the polyurethane matrix composite material. In other embodiments, the polyurethane matrix composite material forms a body that cooperates with another structure to form the article. For example, in some embodiments, the article may include a metal frame that is integrated with the polyurethane article.

The polyurethane articles described herein can be provided in the form of a variety of exterior cladding materials, e.g., as siding materials, as trim materials, as materials for covering eaves or soffits.

In certain embodiments as otherwise described herein, the body includes a front surface that has a textured contour. In some embodiments, the textured contour replicates a surface of a wooden board. For example, front surface 104 of body 102 has a textured contour replicating the surface of a cut wooden board. The term textured contour, as used herein, refers to the specific three dimensional shape of the front surface, including all of the peaks, pits, ridges, and valleys of the surface's contour. While the textured contour of front surface 104 replicates wood, in other embodiments the textured contour replicates another material, such as brick or masonry.

In some embodiments, the textured contour is a digitized rendering of a natural surface. For example, in some embodiments a natural wood surface is scanned using either a laser scanner or a white light scanner to form a digital 3D rendering of the wood. A mold is then fabricated using the digital rendering and the article is produced with the digitized rendering of the wood from the mold. In other embodiments, the digital rendering of the natural product is used by a 3D printer to create the textured contour. Still in other embodiments, a cast is made from the naturally occurring product, and a mold is subsequently made based on the cast.

In certain embodiments as otherwise described herein, the front surface of the body includes a groove forming a nail line, where the nail line is configured to receive mechanical fasteners for attachment to a substrate. For example, body 102 includes a nail line 118 in the form of a groove extending across front face 104 of the upper end 112 of the body. The nail line provides the installer of the plank a location to insert nails or mechanical fasteners in order to attach the plank to a wall substrate. In some embodiments, the body includes indicia that serve as a guide for locating a support structure within the wall substrate. For example, in some embodiments, the body includes a row of letters above the nail line that guide the installer to the location of studs within the wall substrate. In certain embodiments, the textured contour on the front face of the body extends only up to the nail line, while the guiding indicia are above the nail line. The nail line is often covered by an adjacent plank, and therefore the extension of the textured contour above the nail line may be unnecessary. In other embodiments, however, the textured contour extends across the entire front face of the body.

In certain embodiments as otherwise described herein, the body has a height in a range from 6 inches to 12 inches, e.g., from 7 inches to 10 inches, e.g., from 8 inches to 9 inches. In certain embodiments as otherwise described herein, the body has a length in a range from 8 feet to 20 feet, e.g., 12 feet or 16 feet. For example, in some embodiments, the body of the article represents a long and wide cedar plank. Such planks are particularly attractive as cladding for the exterior surface of buildings.

In certain embodiments as otherwise described herein, the body has a thickness in a range from ⅛ inch to 1 inch, e.g., ¼ inch to ½ inch, e.g., 5/16 inch. The term thickness, as used herein, is in reference to the dimension of the polyurethane matrix composite material that forms the body, similar to a wall thickness, rather than the overall depth dimension of the article. For example, the front and rear surfaces 104, 106 each extend across the majority of body 102, and the described thickness is the distance between the front surface 104 and rear surface 106.

In certain embodiments as otherwise described herein, the article further includes a coating including a layer of paint covering at least a front surface of the body. For example, as shown in the detailed sectional view of FIG. 2, article 100 comprises coating 120 including layer of paint 122 covering both the front surface 104 and the rear surface 106 of body 102. Coating 120 also includes a primer layer 124, as described in more detail below. In other embodiments, the coating includes only a single layer of paint, or a single layer of combined paint and primer. Still in other embodiments, the coating includes one or more layers of primer and one or more layers of paint. In some embodiments, the coating includes additional layers, such as protective coatings.

In certain embodiments as otherwise described herein, the body has a first color and the coating has a second color that is different from the first color. As described herein, the color of the coating refers to the visible color of the coating when looking at the article. Thus, while layers within the coating may include more than one color, the described color of the coating should be understood as the color that is seen when looking at the article from a distance, and not when examining a cross section of the coating. As an example of the difference in color between the body and the coating, in certain embodiments the iron oxide component of the inorganic filler imparts a dark red or black color to the polymer matrix composite material, while the coating of paint is white, light grey, or a bright color such as yellow or green. In particular, in some embodiments the color difference is more than 3 Delta-E, e.g., more than 10 Delta-E, e.g., more than 30 Delta-E.

In certain embodiments as otherwise described herein, the coating includes a layer of primer between the body and the layer of paint. In some embodiments, the primer provides a foundation for the layer of paint, and promotes adhesion of the layer of paint to the body. In some embodiments, the primer blocks a portion of UV light directed at the article. However, in certain embodiments, the primer more effectively blocks UV light having a wavelength in a range below 380 nm. The primer may still block some, or even a majority, of UV light having a wavelength above 380 nm, but transmits more light in this wavelength range than in the lower range. This factor can contribute to the benefit of UV blocking within the polyurethane matrix composite material itself.

In certain embodiments as otherwise described herein, the coating is opaque. For example, in some embodiments, the combination of the paint and the primer provides an opaque coating over the article. In other embodiments, the layer of paint is opaque. The term opaque, as used herein, refers to a transmission of no more than 5% of light in the visible light spectrum.

In certain embodiments as otherwise described herein, the article includes a leg protruding from a rear surface of the body. For example, article 100 includes leg 140 protruding outward from rear surface 106 of body 102. The leg 140 supports the lower end 114 of body 102 away from an underlying substrate. Accordingly, at least a portion of any pressure against the front surface of the plank can be transferred directly to the substrate rather than to an underlying plank. Moreover, in some embodiments the leg is vertically supported by the upper edge of a neighboring plank. Accordingly, when installing the planks, an upper row of planks can connect to and be supported by an underlying lower row of planks before the cladding is fixedly secured to the substrate.

Figure 3:
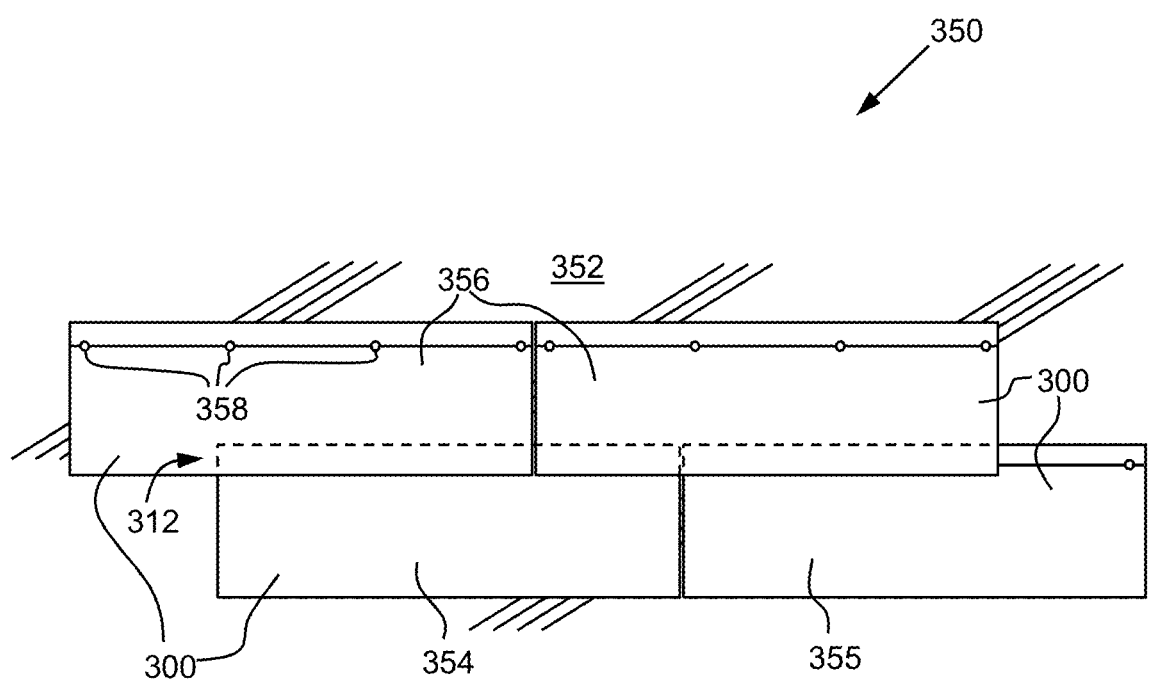
FIG. 3 is a schematic front view of a wall system.

Another aspect of the disclosure provides an exterior cladding system including a wall substrate and a plurality of articles according to any of the embodiments described above. Each of the articles can be formed as a plank and is attached to the wall substrate. A portion of such a system is shown in FIG. 3. System 350 includes a wall substrate 352 and a plurality of planks 300 attached to the wall substrate. In some embodiments the wall substrate is an exterior sheathing of a house or other building. As will be understood by those of ordinary skill in the art, such an exterior sheathing can include a rain protection layer, house wrap, and/or may include furring strips. In other embodiments, the wall substrate is another flat structural component of a construction wall.

In certain embodiments as otherwise described herein, a majority of the planks include an upper edge that is covered by a lower portion of at least one neighboring plank. For example, the upper end 312 of lower plank 354 is covered by the two upper planks 356. A larger portion of system 350 would also show the upper end of lower plank 355 similarly covered by neighboring planks.

In certain embodiments as otherwise described herein, the planks are attached to the wall substrate with mechanical fasteners that extend through the body of the respective siding plank. For example, planks 300 of system 350 are attached to wall substrate 352 by a plurality of nails 358. The nails 358 are driven through the body of the planks and into the wall substrate 352. The wall substrate 352 provides adequate force on the nails to prevent their removal and securely hold the planks 300 against the substrate.

In certain embodiments as otherwise described herein, a majority of the planks include a nail line that is covered by a lower portion of at least one neighboring plank. For example, the upper end of plank 354, including the respective nail line, is behind the upper planks 356. Accordingly, the nail line and the corresponding nails are both obscured from view.

Another aspect of the present disclosure provides a method of forming a polyurethane article according to any of the embodiments described above. The method includes introducing material components of a polyurethane into an extruder and introducing an inorganic filler (e.g., of any type as otherwise described herein, e.g., calcium carbonate and an iron oxide in a range from 0.5% to 7% by weight of the inorganic filler) into the extruder. The method further includes mixing the material components of the polyurethane and the inorganic filler in the extruder so as to form a polyurethane matrix composite material. In other embodiments the reaction is carried out in alternative mixing device or reaction vessel.

Figure 5:
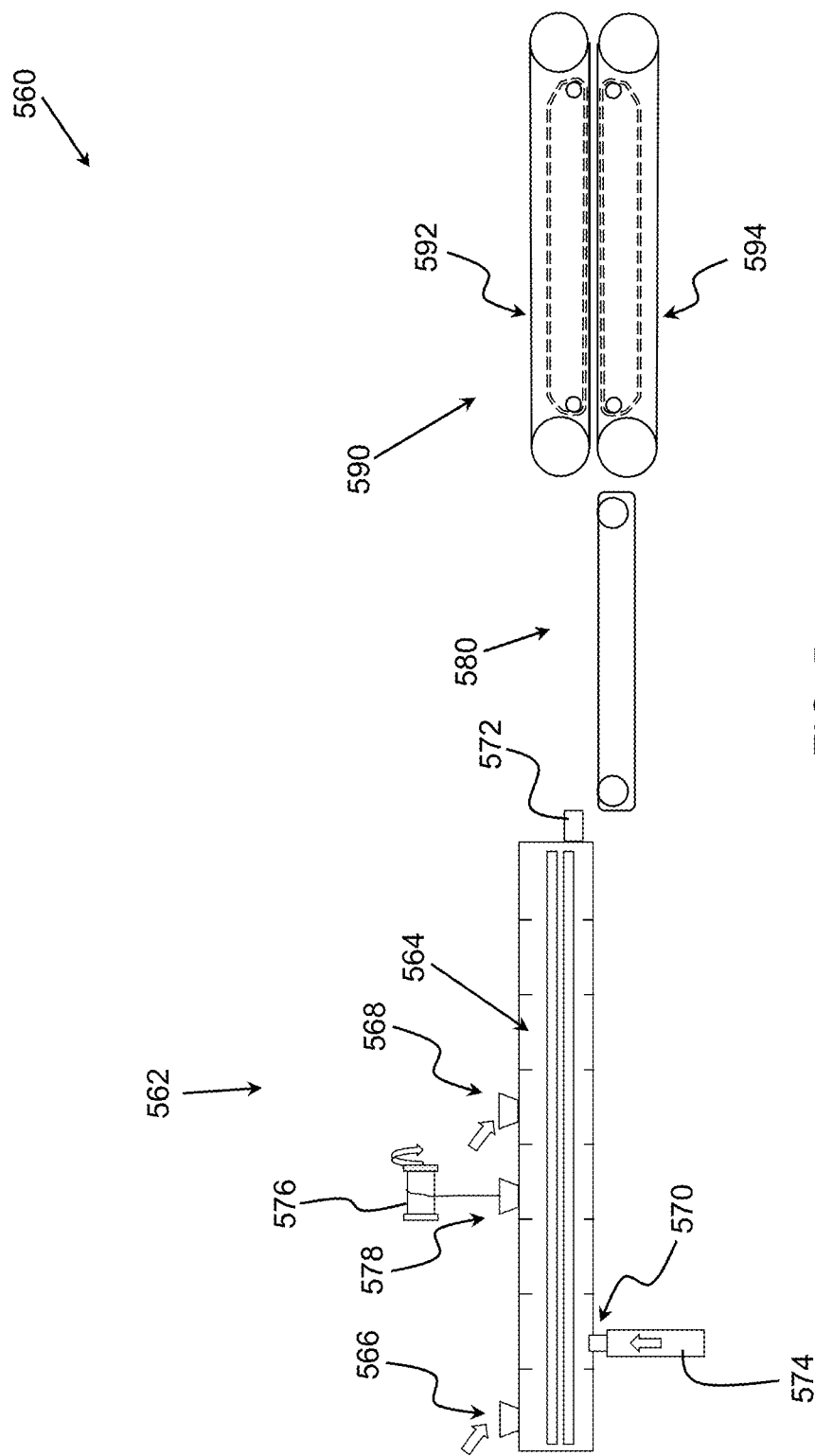
FIG. 5 is a schematic side view of a system for manufacturing an article including a polyurethane matrix composite material.

A system for carrying out such a method is shown in FIG. 5. System 560 includes an extruder 562, a conveyor 580 and a mold 590. Extruder 562 includes an extruder body 564 that contains the component materials and resultant polyurethane matrix composite material as it passes through the extruder. Extruder body 564 includes several inlets 566, 568, 570 configured to allow the introduction of various component materials into the extruder body and an outlet 572.

In certain embodiments as otherwise described herein, the extruder includes one or more rotatable screws configured to mix the component materials introduced into the extruder body and to convey the mixture to the outlet of the extruder body. The person of ordinary skill in the art will appreciate that a wide variety of screw designs are suitable for use in the extruder including single or twin screws and having sections with various configurations including, but not limited to, transfer screws, slotted screws, lobal screws, kneading blocks, reverse screws and combinations thereof.

In certain embodiments as otherwise described herein, the material components of the polyurethane include a polyol and an isocyanate. As explained above and as will be appreciated by those of ordinary skill in the art embodiments of the disclosure include a wide range of polyols and isocyanates. The polyol and isocyanate components of the reaction mixture are added to the extruder 562 in order to stimulate the reaction to produce the polyurethane matrix material.

In certain embodiments as otherwise described herein, the introducing the material components of the polyurethane includes introducing the polyol to the extruder before introducing the isocyanate. For example, in system 560, the polyol is introduced into extruder body 564 through first inlet 566 and the isocyanate is introduced into extruder body 564 downstream of the polyol through second inlet 568. Adding the polyol prior to the isocyanate allows the polyol and any other material components of the mixture to begin mixing prior to the reaction that occurs with introduction of the isocyanate.

In certain embodiments as otherwise described herein, the method further includes mixing the polyol and the inorganic filler before introducing the isocyanate. For example, in system 560, the filler is introduced into extruder body 564 using a feed extruder 574, or side stuffer, that provides filler to a filler inlet 570. The filler inlet 570 is disposed upstream of second inlet 568 so that the polyol and the filler can mix prior to introduction of the isocyanate. In extruder 562, the filler inlet 570 is downstream of the first inlet 564. In other embodiments, the filler is introduced into the extruder together with the polyol or upstream of the polyol. In other embodiments the filler is introduced into the extruder in stages. Still in other embodiments the filler is mixed with other material components of the mixture, such as the polyol, prior to introduction into the extruder.

In certain embodiments as otherwise described herein, the method includes adding an amine catalyst to the mixture of component materials. The amine catalyst can promote reactions between hydroxyl and isocyanate groups thereby accelerating the reaction. Suitable amine catalysts include primary, secondary, and tertiary amines. Some examples of amines include, but are not limited to, diisopropanolamine, triethanolamine, triethylamine, monoethanolamine, dimethylethylamine, dimethylethanolamine, and 2-amino-2-methylpropanol triethylene diamine. In certain embodiments, the amount of amine catalyst ranges from about 0.01%, by weight, to about 0.1% by weight of the mixture. Suitable amine catalysts are commercially available, for example, from Evonik under the trade name Tegoamin.

In certain embodiments as otherwise described herein, the method includes adding an organometallic catalyst to the mixture of component materials. The organometallic catalyst can promote the reaction between water and the isocyanate groups to generate $CO_2$ which acts as a blowing agent to foam the resultant polyurethane matrix. Suitable organometallic catalysts include carboxylates and mercatides. Some examples of organometallic catalysts include, but are not limited to, organotin compounds, including dibutyltin dilaurate and dibutyltin oxide. In certain embodiments, the amount of organometallic catalyst ranges from about 0.001%, by weight, to about 0.01%, by weight. Suitable organometallic catalysts are commercially available, for example, from Momentive under the trade name Fomrez. In some embodiments, more than two catalysts are used.

In certain embodiments as otherwise described herein, the method includes adding chain extenders, cross linkers, or combinations thereof to the mixture of component materials. For example, in some embodiments, the chain extender includes ethylene glycol, glycerin, 1,4-butane diol, trimethylolpropane, glycerol, sorbitol, or combinations thereof. In some embodiments, the chain extender is an amine chain extender, for example a diamine.

In certain embodiments as otherwise described herein, the method includes adding a surfactant to the mixture of component materials. Suitable surfactants include anionic or cationic surfactants. In some embodiments the surfactant is a silicone surfactant. Suitable surfactants are commercially available, for example, from Evonik under the trade name Dabco.

In certain embodiments as otherwise described herein, the method includes adding a fibrous material, or a fibrous material precursor, to the mixture of component materials. For example, system 560 includes a fibrous material precursor, such as a roving 576, that supplies fibrous material disposed on a spool to the extruder body 564. The roving unwinds as the fibrous material precursor is fed into the extruder through fibrous material inlet 578.

In certain embodiments as otherwise described herein, the method further includes delivering the polyurethane matrix composite material to a mold, and shaping the polyurethane matrix composite material in the mold. In certain embodiments as otherwise described herein, the mold forms the polyurethane matrix composite material into a body. For example, system 560 includes a conveyor belt 580 that receives the polyurethane matrix composite material as it exits extruder 562 and carries the material to a mold in the form of a double belt forming machine 590, the double belt forming machine forms the polyurethane matrix composite material into a body between two rolling belts 592, 594.

In certain embodiments as otherwise described herein, the mold imparts a textured contour onto a front surface of the body. For example, the lower belt 594 may include a mold that forms a textured contour replicating a wood surface on the front surface of the body of the article.

In certain embodiments as otherwise described herein, the method further includes applying a coating including a layer of paint covering at least a first portion of the body. In certain embodiments as otherwise described herein, the method further includes applying a layer of primer covering at least the first portion of the body before applying the layer of paint. In some embodiments, the layers of paint and primer are applied using a spray at a painting station. In some embodiments the layers of paint and primer are applied to the article body in the same facility as the extruder and mold. In other embodiments, the articles are transported to another location before being primed and painted.

Another aspect of the disclosure relates to the use of a mixture of fly ash and a first substance selected from calcium carbonate, talc, sand and kaolin clay in an inorganic filler. Accordingly, another aspect of the disclosure is a polymer matrix composite material comprising: a polyurethane matrix; and an inorganic filler in a range from 45% to 85% by weight of the composite material, the inorganic filler including: a first substance from the group consisting of calcium carbonate, sand, talc, kaolin clay, dolomite, feldspar and mica or a mixture thereof (e.g., from the group consisting of calcium carbonate, sand, talc and kaolin clay and any mixtures thereof), and fly ash. Iron oxide may optionally be included as described above. In certain such embodiments, at least 25% of the inorganic filler is fly ash and at least 25% of the inorganic filler is the first substance. In certain embodiments, at least 75%, at least 85% or even at least 95% of the inorganic filler is fly ash and the first substance. The filler can further include other filler materials (e.g., fibrous materials) as in every embodiment described above with respect to iron oxide-containing materials. The material can otherwise be as described above with respect to iron oxide-containing materials.

Another aspect of the disclosure relates to a method for providing a polyurethane article (e.g. an exterior cladding material as described herein). The method includes measuring the transmittance in the ultraviolet (e.g., at a wavelength in the range of 300 nm to 400 nm, or 320 nm to 380 nm) of a material, and, based on the measured transmittance, including the material as an inorganic filler in a polyurethane article as otherwise described herein. For example, if the transmittance is below a threshold value (e.g., less than 7% or less than 5% transmission at a wavelength in the range of 300 to 400 nm or 320 nm to 380 nm when in 1" diameter disk made by pressing 2 g of test material at 2 wt % in a UV-transmissive material), the method includes making a polyurethane article as otherwise described herein. The method can also include determining an amount of the filler to include in a polyurethane article. Further aspects are described below in Example 2.

Certain aspects of the disclosure are now explained further via the following non-limiting examples.

Example 1—UV Degradation Comparison

A series of nine samples of polyurethane matrix composite materials were made to compare the UV degradation of different filler materials. For each sample a polyol and filler were mixed in a disposable container. Isocyanate was then injected into the mixture using a syringe and mixed for 30 seconds. The mixture was then poured into a silicone mold that was coated with a mold release spray. Using a Carver press, the mixture was held under 600 pounds of pressure at 95° C. for 15 minutes. The resulting plaques were 4.0 inches by 4.0 inches by 0.5 inches. The nine different filler materials included 1) calcium carbonate, 2) fly ash, 3) a blend of calcium carbonate, 1.5% $Fe_3O_4$ and 1.5% $Fe_2O_3$, 4) a blend of calcium carbonate and 1% $Fe_3O_4$, 5) a blend of calcium carbonate and 3% $Fe_3O_4$, 6) a blend of calcium carbonate and 5% $Fe_3O_4$, 7) a blend of calcium carbonate and 1% $Fe_2O_3$, 8) a blend of calcium carbonate and 3% $Fe_2O_3$, and 9) a blend of calcium carbonate and 5% $Fe_2O_3$.

The prepared plaques were then subjected to a UV exposure test to compare the degradation corresponding to each of the different fillers. The test included 672 hours in a QUV accelerated weathering tester made by Q-lab, subjecting the plaque to UV light, heat and moisture in accordance with the ASTM G154 Cycle 4 test.

Figure 6:
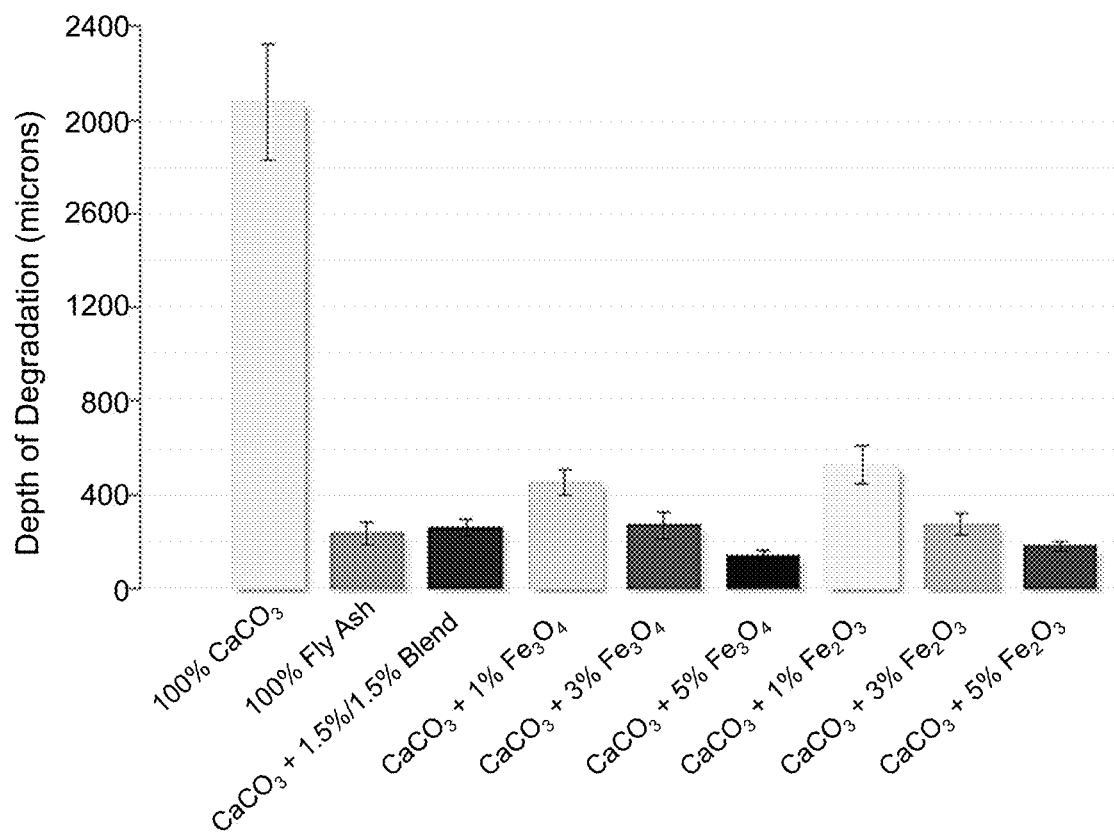
FIG. 6 is a chart illustrating a comparison of UV degradation depth of polyurethane matrix composite materials using different fillers

After testing, the plaques were cut to reveal their cross sections and the degradation was determined by analyzing the color change under microscopy. The results of the UV degradation are shown in FIG. 6. As shown, the depth of degradation using a filler of pure calcium carbonate was severe. However, with the addition of 1% iron oxide, either $Fe_3O_4$ or $Fe_2O_3$, the degradation depth was dramatically reduced. At 3% iron oxide, using $Fe_3O_4$. $Fe_2O_3$ or a blend, the depth of degradation was statistically equivalent to the plaque with a conventional filler of fly ash. Further, filler including 5% iron oxide outperformed conventional the samples made using conventional fly ash filler.

Example 2—Comparing UV Transmission with Performance

In another set of experiments, the UV transmission metrics of candidate fly ash—$CaCO_3$ filler blends vs. pure fly ash filler were investigated. By performing image analysis on samples exposed in a QUV chamber, the depth of degradation permitted by each of these filler blends was investigated. UV transmission was correlated with depth of degradation, confirming that UV transmission is in fact a good metric by which to compare filler blends.

Samples were prepared by first preparing filled polyurethane prepolymeric formulations having fly ash/calcium carbonate blend at 62.1 wt % and water at 0.22 wt % as a blowing agent. The preparation was poured into a silicone mold previously coated by a mold release spray. Then the mold was put in a Carver press at 90-95° C. for 15 minutes under 600 pounds of pressure. The final size of the samples was 4"×4"×0.5". The composition of the fly ash/calcium carbonate blends is shown in the table below:

| Filler | Percentage of fly ash (%) |
| --- | --- |
| Fly ash - Coal Creek | 100 |
| FA/CaCO$_3$ - 50/50 | 50 |
| FA/CaCO$_3$ - 25/75 | 25 |
| FA/CaCO$_3$ - 10/90 | 10 |
| CaCO$_3$ - Lhoist C65/200 | 0 |

Fillers can absorb, transmit or reflect UV light as it penetrates the polyurethane material. In order to better explain the role of fillers in preventing deep UV degradation of the polyurethane, a method was developed to measure their UV absorbance and transmittance.

Thin, 1" diameter disks made of 2 wt % filler in potassium bromide (KBr) (FTIR grade, from Sigma Aldrich) were made by blending 1.96 g of ground KBr and 0.04 g of filler and pressing the resulting powder in a cylindrical mold using a Carver press. Disks with 2% Coal Creek fly-ash, $CaCO_3$, or blends of fly ash and $CaCO_3$ were made to compare their UV light transmission properties. The disks made with 2 g of powder were thin and fragile and could only be used to measure absorbance and transmittance, not reflectance in a UV-Vis spectrophotometer (Perkin Elmer Lambda 950). KBr is transparent in the UV and visible regions, allowing the measurement of the optical properties of the fillers only.

The ability of different filler blends to protect the polyurethane against incident UV light was investigated. Lab plaque samples with varying fly ash—$CaCO_3$ filler blends were placed in a QUV chamber for 672 hours and exposed to UV, heat, and moisture in accordance with the ASTM G154 Cycle 4 test. This exposure consists of 8 hours of UV light at its highest intensity (1.55 W/m²/nm at 340 nm) at 70° C., followed by 4 hours of dark condensation at 50° C.

Figure 7A:
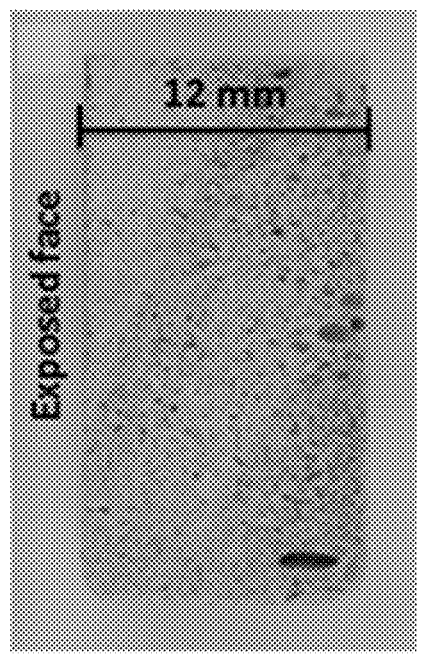
FIG. 7A is a cross-sectional image of a lab plaque sample used in Example 2.
Figure 7B:
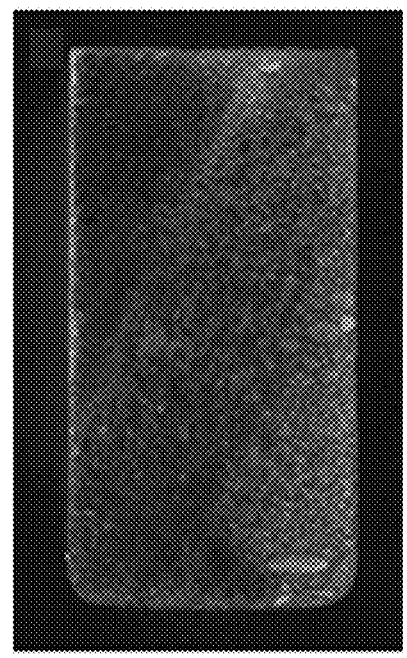
FIG. 7B is the b* component of the original image, obtained with the Color Space Converter plugin to highlight yellowed areas.
Figure 7C:
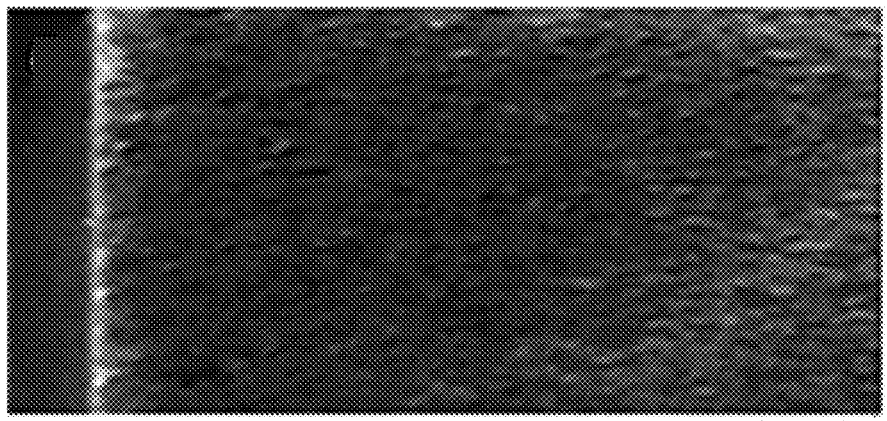
FIG. 7C is a magnified inset of FIG. 7B.
Figure 7D:
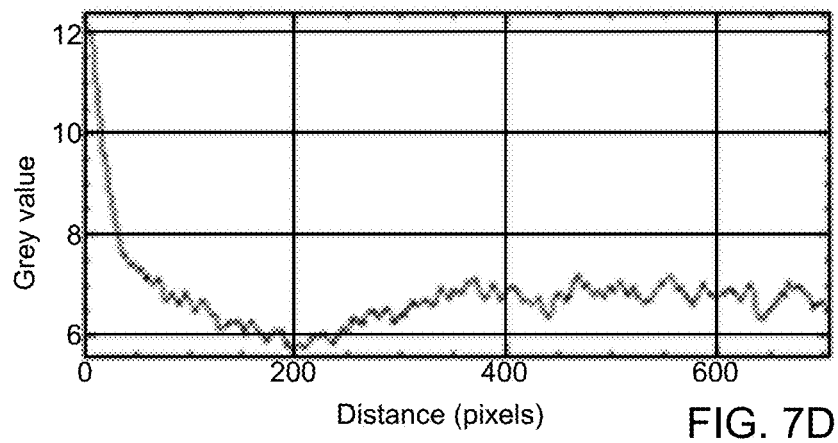
FIG. 7D is the plot profile produced in ImageJ, showing yellowing as a function of depth through the bulk.

After 4 weeks of exposure in the QUV chambers, the lab plaque samples were removed and cut with a circular saw to reveal their cross section. Eight samples were cut for each composition and tested for reproducibility. Samples were then placed into a photo booth equipped to provide reproducible diffuse white light and photographed with constant exposure settings. An example photograph is provided in FIGS. 7.A-D FIG. 7A is the cross-sectional image of the lab plaque, with the exposed face pointed to the left. FIG. 7B is the b* component of the original image, obtained with the Color Space Converter plugin to highlight yellowed areas. FIG. 7C is a magnified inset of FIG. 7B. FIG. 7D is the plot profile produced in ImageJ, showing yellowing as a function of depth through the bulk.

All sample images were analyzed in ImageJ using the Color Space Converter plugin, which takes an RGB image, converts it to the LAB color space, and outputs three separate greyscale images corresponding to the L*, a*, and b* components. Since polyurethane degradation manifests mostly as yellowing, the b* image was chosen for analysis (example shown in FIG. 7

After 4 weeks of exposure in the QUV chambers, the lab plaque samples were removed and cut with a circular saw to reveal their cross section. Eight samples were cut for each composition and tested for reproducibility. Samples were then placed into a photo booth equipped to provide reproducible diffuse white light and photographed with constant exposure settings. An example photograph is provided in FIGS. 7.A-D). Following manual rotation to ensure that the sample was perpendicular to the image edges, a plot profile was produced for each image, showing the average grey value through the bulk of the sample. This grey value in the b* image represents the yellowing present in the RGB image and is taken to be a metric of the extent of degradation present.

Figure 8:
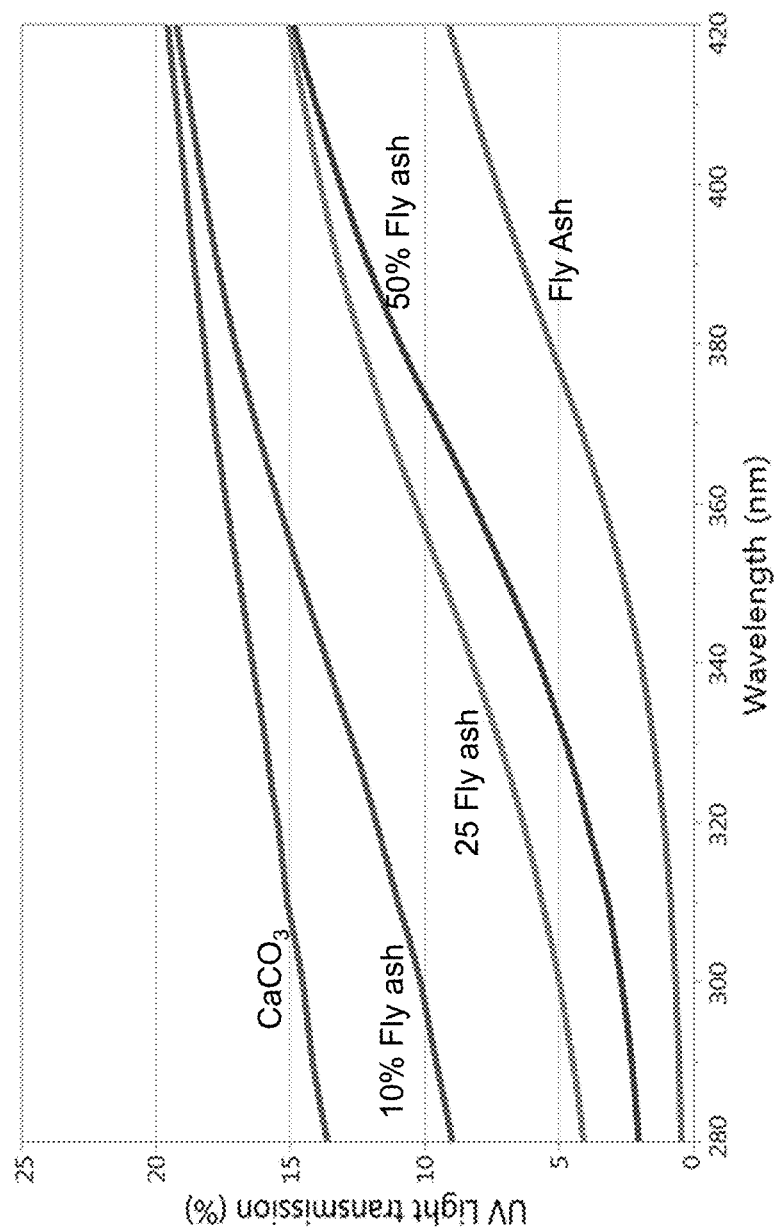
FIG. 8 is a graph of the transmission spectra in the UV range of fly ash, calcium carbonate and blends of different ratios of fly ash and calcium carbonate.
Figure 9:
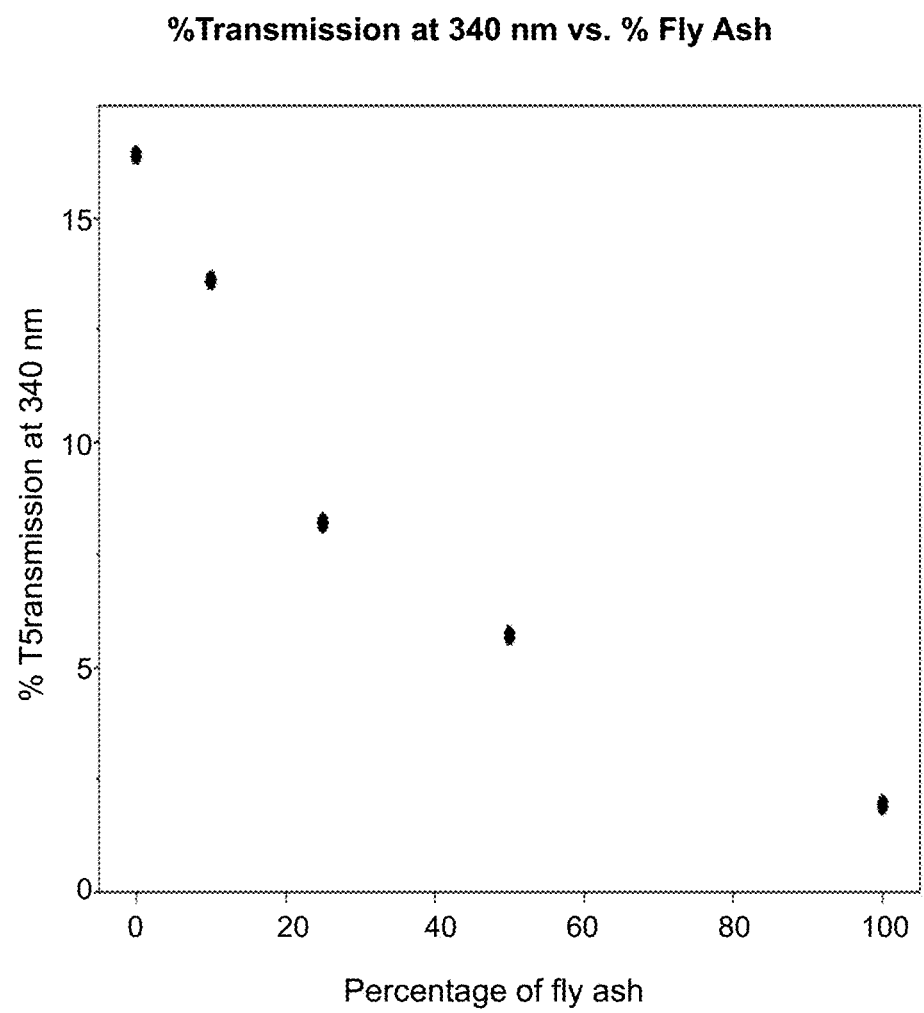
FIG. 9 is a graph of transmission at 340 nm vs. percent fly ash, based on the data of FIG. 8.

FIG. 8 shows the transmission spectra in the UV range of fly ash, calcium carbonate and blends of different ratios of fly ash and calcium carbonate. Fly ash is more UV blocking than calcium carbonate. Adding fly ash to calcium carbonate helps to improve the UV blocking behavior of the filler blends; the amount of UV light transmitted is reduced. Nevertheless, even with a 50/50 blend of $CaCO_3$ and fly ash the amount of light transmitted is still higher than pure fly ash. FIG. 9 shows that increasing the fly ash content decreases the percentage of light transmitted.

This method is a good way to have a first idea of how a filler performs in terms of UV blocking. Nevertheless, due to the small amount of powder required (0.04 g) to produce the disks, there is observed some variability in the UV transmission measurements. However, the general trend observed exhibits a decrease in UV transmission with increasing fly-ash content.

Figure 10:
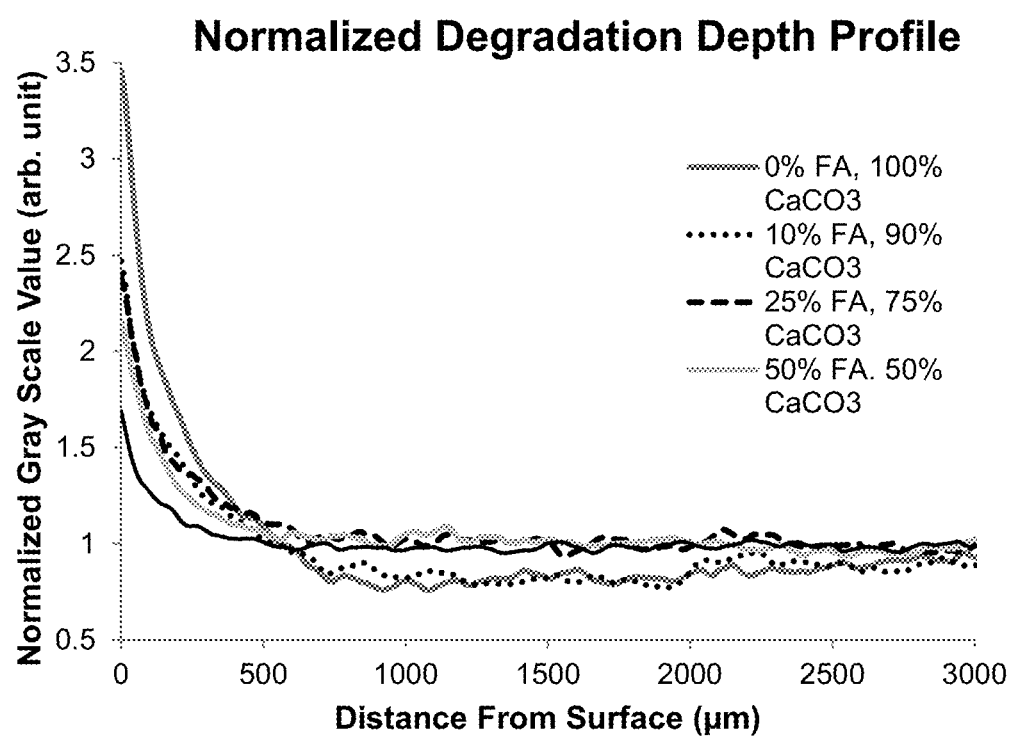
FIG. 10 is a set of degradation depth profiles for a representative lab plaque sample for each filler blend.

Through the QUV exposure experiments and ImageJ analysis, the inventors found that depth of degradation decreases with increasing fly ash content in the filler. FIG. 10 shows the degradation depth profiles for a representative lab plaque sample for each filler blend. As described above, the grey scale value in the b* space to track the extent of yellowing of the samples. Since each sample has a different initial color, depending on the filler blend, the data were normalized by dividing all values by the average greyscale value between 2,000 μm and 8,000 μm in order to be able to compare the depth of degradation profile for all samples. As fly ash content in the filler increases, both the extent of degradation at a given depth and the total depth of degraded material decrease as expected.

Figure 11:
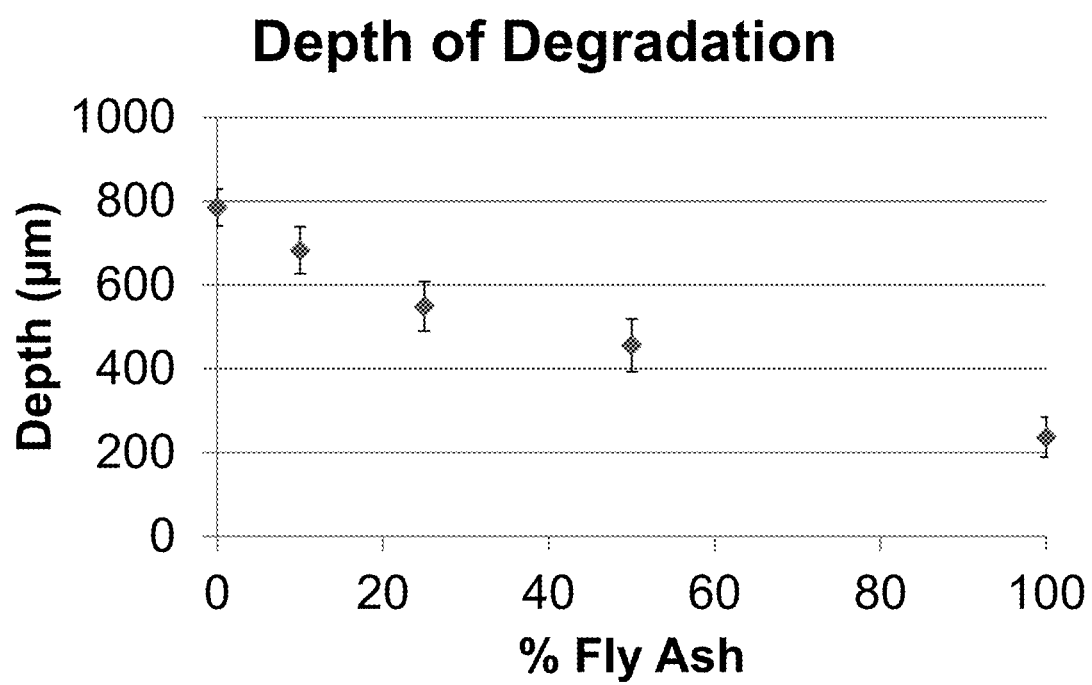
FIG. 11 is plot of depth of degradation as a function of filler fly ash content and was generated from the data that produced FIG. 10.

FIG. 11 gives depth of degradation as a function of filler fly ash content and was generated from the data that produced FIG. 10; error bars represent the standard deviation of the depth values calculated for n=8 samples of each blend. The criterion used to determine depth of degradation from the plot profiles is detailed in the Appendix. Pure $CaCO_3$ fillers permitted deep degradation of approximately 800 µm, whereas fly ash fillers only allowed 300 µm of degradation. Incremental addition of fly ash to $CaCO_3$ in the filler composition reduced the depth of degradation in a nearly linear fashion. Modest additions of 10-25% fly ash to a primarily $CaCO_3$ filler did not drastically reduce the UV damage sustained, and even a 50/50 blend of $CaCO_3$ and fly ash permitted close to 500 µm of degradation depth.

Figure 12:
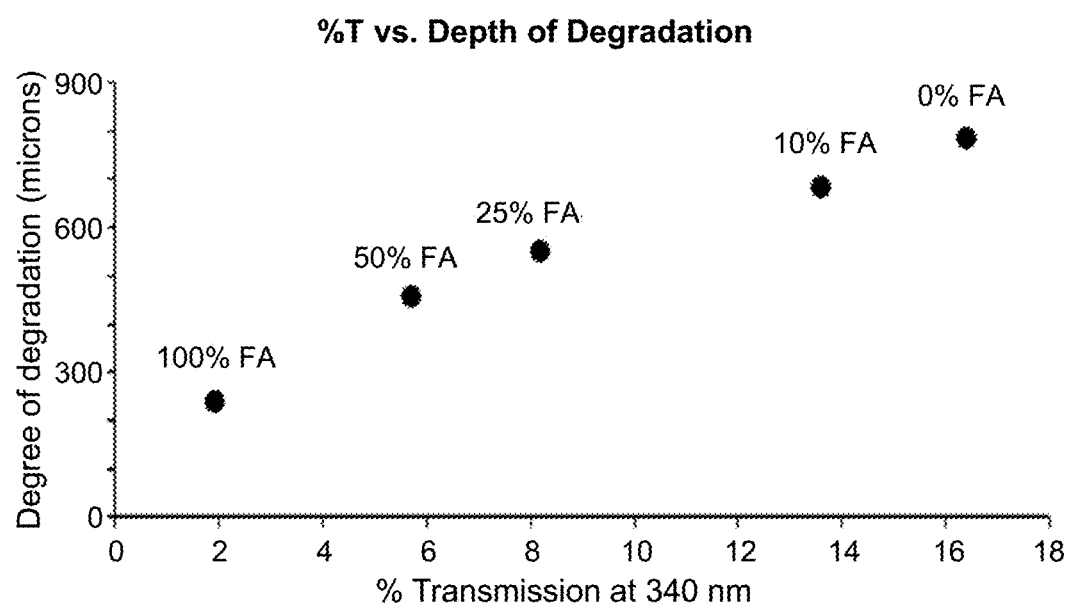
FIG. 12 is a graph of depth of degradation vs. % transmission at 340 nm.

FIG. 12 provides a graph of depth of degradation vs. % transmission at 340 nm. The inventors have determined that 340 nm is an especially suitable wavelength for the correlation. Thus, the data demonstrate that depth of degradation permitted by the filler blends correlates roughly linearly with % transmission, as expected. This result confirms that fillers higher in $CaCO_3$ content are more UV transparent and permit deeper degradation than those high in fly ash content. As a result of the slight uncertainty in measurement of thin disks of material, the average of multiple (e.g., three or more) measurements recorded with different disks should be used.

Example 3—Comparing UV Transmission with Performance

Figure 13:
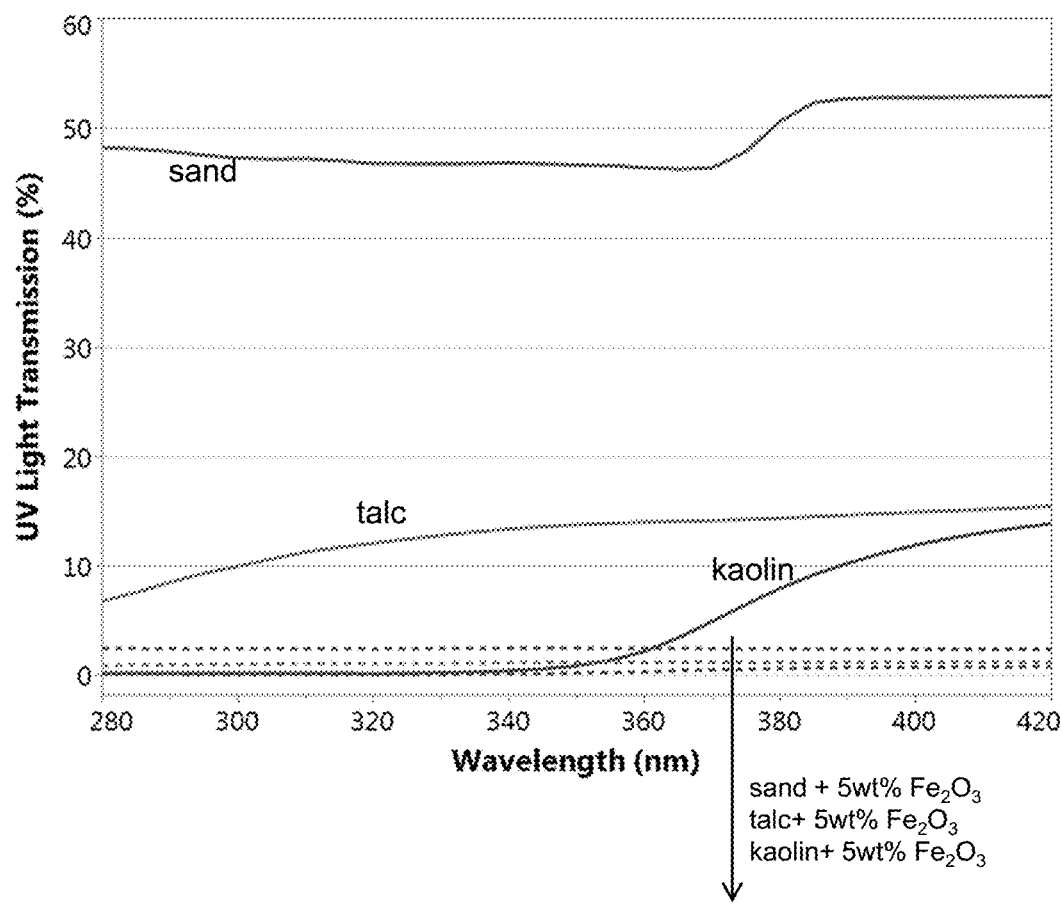
FIG. 13 is a graph of UV transmission for a variety of inorganic fillers with and without iron oxide.
Figure 14:
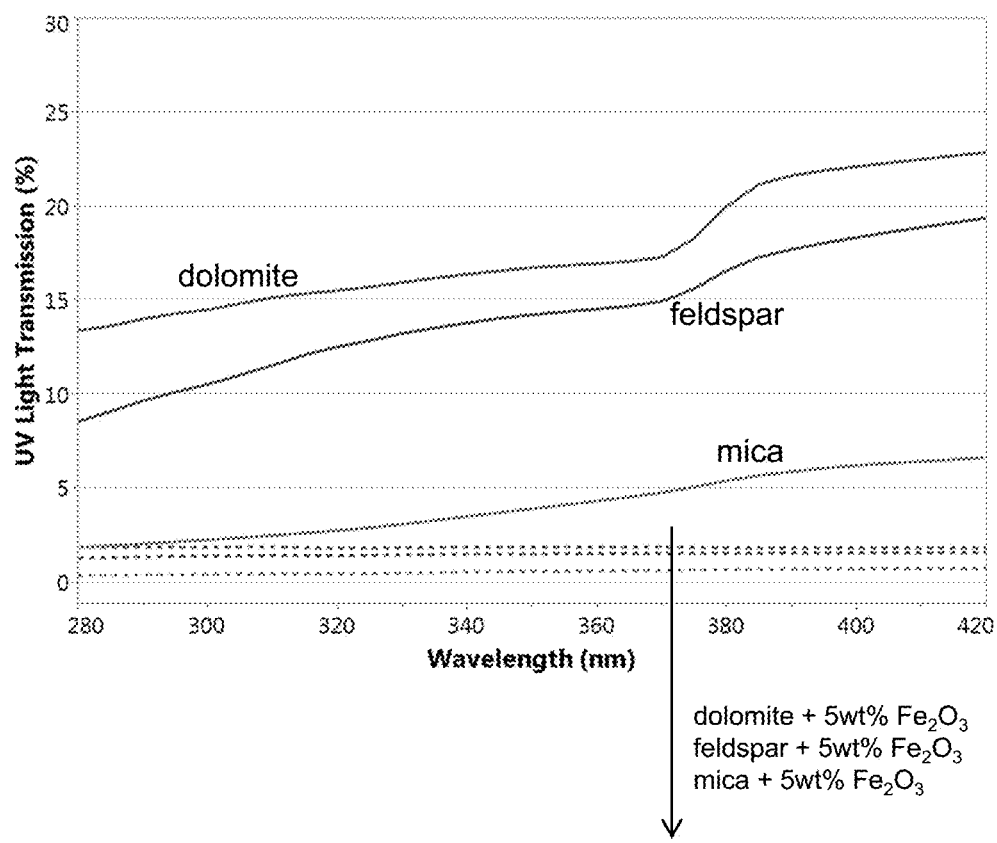
FIG. 14 is a graph of UV transmission for a variety of inorganic fillers with and without iron oxide.

In another set of experiments, the effect of iron oxide on the transmission of fillers containing sand, talc, kaolin, dolomite, feldspar and mica was studied. FIGS. 13 and 14 provide transmission spectra for the substances alone and the substances with iron oxide added.

Additional aspects of the disclosure are provided by the following enumerated embodiments, which can be combined and permuted in any number and in any combination that is not technically or logically inconsistent.

Embodiment 1

A polymer matrix composite material comprising:
a polyurethane matrix; and
an inorganic filler in a range from 45% to 85% by weight of the composite material, the inorganic filler including:
  a first substance selected from the group consisting of calcium carbonate, sand, talc, kaolin clay, dolomite, feldspar and mica and any mixtures thereof, and
  an iron oxide in a range from 0.5% to 7% by weight of the inorganic filler.

Embodiment 2

A polymer matrix composite material comprising:
a polyurethane matrix; and
an inorganic filler in a range from 45% to 85% by weight of the composite material, the inorganic filler including:
  a first substance selected from the group consisting of calcium carbonate, sand, talc, kaolin clay, dolomite, feldspar and mica and any mixtures thereof, and
  fly ash.

Embodiment 3

The polymer matrix composite material according to embodiment 2, further comprising an iron oxide in a range from 0.5% to 7% by weight of the inorganic filler.

Embodiment 4

The polymer matrix composite material according to any of embodiments 1-3, wherein the inorganic filler includes fly ash in an amount of at least 10%.

Embodiment 5

The polymer matrix composite material according to embodiment 4, wherein the inorganic filler includes the fly ash in an amount of at least 25% and the first substance in an amount of at least 25%.

Embodiment 6

The polymer matrix composite material according to any of embodiments 1-5, wherein at least 75% by weight of the inorganic filler is fly ash and/or the first substance.

Embodiment 7

The polymer matrix composite material according to any of embodiment 1 to 6, wherein the amount of iron oxide, by weight, in the inorganic filler is in a range from 1% to 6%, e.g., about 3% to about 5%.

Embodiment 8

The polymer matrix composite material according to any of embodiments 1 to 7, wherein the iron oxide includes at least one of $Fe_3O_4$ and $Fe_2O_3$.

Embodiment 9

The polymer matrix composite material according to any of embodiments 1-8, wherein the amount of the first substance, by weight, in the inorganic filler is at least 50%, e.g., at least 60%, at least 75%, at least 85%, at least 90%, or even at least 95%.

Embodiment 10

The polymer matrix composite material according to any of embodiments 1-9, wherein the first substance is selected from the group consisting of calcium carbonate, sand, talc, and kaolin clay.

Embodiment 11

The polymer matrix composite material according to any of embodiments 1-10, wherein the first substance comprises (or is at least 90%, or consists of) calcium carbonate.

Embodiment 12

The polymer matrix composite material according to any of embodiments 1-11, wherein the first substance comprises (or is at least 90%, or consists of) sand.

Embodiment 13

The polymer matrix composite material according to any of embodiments 1-12, wherein the first substance comprises (or is at least 90%, or consists of) talc.

Embodiment 14

The polymer matrix composite material according to any of embodiments 1-13, wherein the first substance comprises (or is at least 90%, or consists of) kaolin clay.

Embodiment 15

The polymer matrix composite material according to any of embodiments 1-14, wherein the first substance comprises (or is at least 90%, or consists of) dolomite.

Embodiment 16

The polymer matrix composite material according to any of embodiments 1-15, wherein the first substance comprises (or is at least 90%, or consists of) feldspar.

Embodiment 17

The polymer matrix composite material according to any of embodiments 1-16, wherein the first substance comprises (or is at least 90%, or consists of) mica.

Embodiment 18

The polymer matrix composite material according to any of embodiments 1-17, wherein an average particle size of the first substance is in a range from 5 to 50 μm, e.g., from 8 to 20 μm.

Embodiment 19

The polymer matrix composite material according to any of embodiments 1-18, wherein the polyurethane is formed from at least a polyol and an isocyanate.

Embodiment 20

The polymer matrix composite material according to any of embodiments 1-19, wherein the polyurethane matrix composite material includes a polyurethane foam.

Embodiment 21

The polymer matrix composite material according to any of embodiments 1-20, wherein the inorganic filler is substantially dispersed throughout the material.

Embodiment 22

The polymer matrix composite material according to any of embodiments 1-21, wherein the inorganic filler further includes a fibrous material.

Embodiment 23

The polymer matrix composite material according to embodiment 22, wherein the fibrous material is a glass fiber.

Embodiment 24

A polyurethane article comprising a body composed of the polymer matrix composite material according to any of embodiments 1-23.

Embodiment 25

The article according to embodiment 24, wherein the article is in the form of an exterior cladding, e.g., a siding, a trim, or a covering for an eave or a soffit.

Embodiment 26

The article according to embodiment 25, wherein the body includes a front surface that has a textured contour.

Embodiment 27

The article according to embodiment 26, wherein the textured contour replicates a surface of a wooden board.

Embodiment 28

The article according to any of embodiments 24-27, wherein the article has a height in a range from 4 inches to 14 inches, e.g., from 7 inches to 10 inches, e.g., from 8 inches to 9 inches.

Embodiment 29

The article according to any of embodiments 24-28, wherein the article has a length in a range from 4 feet to 20 feet, e.g., 12 feet or 16 feet.

Embodiment 30

The article according to any of embodiments 24-29, wherein the article has a thickness in a range from ¼ inch to 1½ inches; e.g., from ¼ inch to ¾ inch, e.g., from ¼ inch to ½ inch, e.g., 5/16 inch.

Embodiment 31

The article according to any of embodiments 24-30, further comprising a coating including a layer of paint, wherein the coating covers at least a front surface of the body.

Embodiment 32

The article according to embodiment 31, wherein the body has a first color and the coating has a second color that is different from the first color.

Embodiment 33

The article according to embodiment 31 or embodiment 32, the coating includes a layer of primer between the body and the layer of paint.

Embodiment 34

The article according to any of embodiments 31-33, wherein the coating is opaque.

Embodiment 35

An exterior cladding system comprising:
a wall substrate; and a plurality of articles according to any of embodiments 24-34,
wherein each of the articles is formed as a plank of exterior cladding and is attached to the wall substrate.

Embodiment 36

The exterior cladding system according to embodiment 35, wherein a majority of the planks include an upper edge that is covered by a lower portion of at least one neighboring plank.

Embodiment 37

The exterior cladding system according to embodiment 35 or embodiment 36, wherein the planks are attached to the wall substrate with mechanical fasteners that extend through the body of the respective plank.

Embodiment 38

The exterior cladding system according to embodiment 37, wherein a majority of the planks include a nail line that is covered by a lower portion of at least one neighboring plank.

Embodiment 39

A method of forming a polyurethane article according to any of embodiments 24-35, the method comprising:
introducing material components of a polyurethane into an extruder;
introducing an inorganic filler into the extruder, the inorganic filler including:
the first substance, and
fly ash and/or an iron oxide in a range from 0.5% to 7% by weight of the inorganic filler; and
mixing the material components of the polyurethane and the inorganic filler in the extruder so as to form an article including a polyurethane matrix composite material.

Embodiment 40

The method according to embodiment 39, wherein the material components of the polyurethane include a polyol and an isocyanate.

Embodiment 41

The method according to embodiment 40, wherein the introducing the material components of the polyurethane includes introducing the polyol to the extruder before introducing the isocyanate.

Embodiment 42

The method according to embodiment 40, further comprising mixing the polyol and the inorganic filler before introducing the isocyanate.

Embodiment 43

The method according to any of embodiments 40-42, further comprising delivering the polyurethane matrix composite material to a mold, and shaping the polyurethane matrix composite material in the mold.

Embodiment 45

The method according to embodiment 43, wherein the mold forms the polyurethane matrix composite material into a body.

Embodiment 46

The method according to embodiment 44, wherein the mold imparts a textured contour onto a front surface of the body.

Embodiment 47

The method according to embodiment 45 or embodiment 46, further applying a coating including a layer of paint covering at least a first portion of the body.

Embodiment 48

The method according to embodiment 47, further comprising applying a coating of primer covering at least the first portion of the body before applying the coating of paint.

Embodiment 49

A method for providing a polyurethane article comprising measuring the transmittance in the ultraviolet (e.g., at a wavelength in the range of 300 nm to 400 nm, or 320 nm to 380 nm) of a material, and, based on the measured transmittance, including the material as an inorganic filler in a polyurethane article according to any of the embodiments above.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:
1. An exterior siding system comprising:
a wall substrate; and
a plurality of exterior siding articles, wherein each of the exterior siding articles is formed as a plank of exterior siding and is attached to the wall substrate, wherein a majority of the planks include an upper edge that is covered by a lower portion of at least one neighboring plank, wherein each exterior siding article comprises an extruded body having a thickness in a range from ⅛ inch to 1 inch and composed of a polymer matrix composite material comprising:
a polyurethane matrix; and
inorganic filler substantially dispersed throughout the composite material and present in a range from 45% to 85% by weight of the composite material, the inorganic filler including:
a first substance present in the inorganic filler in an amount of at least 75 wt % of the inorganic filler, the first substance being selected from the group consisting of calcium carbonate, sand, talc, kaolin clay, dolomite, feldspar and mica and any mixtures thereof, and an iron oxide in a range from 0.5% to 7% by weight of the inorganic filler.

2. The exterior siding system according to claim 1, wherein each exterior siding article is attached to the wall substrate with mechanical fasteners that extend through the body of the exterior siding article.

3. The exterior siding system according to claim 1, wherein a majority of the exterior siding articles include a nail line that is covered by a lower portion of at least one neighboring exterior siding article.

4. The exterior siding system according to claim 1, wherein the inorganic filler further comprises fly ash.

5. The exterior siding system according to claim 4, wherein the inorganic filler includes the fly ash in an amount of at least 10% by weight of the inorganic filler.

6. The exterior siding system according to claim 1, wherein the amount of iron oxide, by weight, in the inorganic filler is in a range from 1% to 6%.

7. The exterior siding system according to claim 1, wherein the iron oxide includes at least one of $Fe_3O_4$ and $Fe_2O_3$.

8. The exterior siding system according to claim 1, wherein the amount of the first substance, by weight, in the inorganic filler is at least 90%.

9. The exterior siding system according to claim 1, wherein the first substance is selected from the group consisting of calcium carbonate, sand, talc, and kaolin clay.

10. The exterior siding system according to claim 1, wherein the first substance comprises calcium carbonate.

11. The exterior siding system according to claim 1, wherein an average particle size of the first substance is in a range from 5 to 50 µm.

12. The exterior siding system according to claim 1, wherein each exterior siding article has a length in the range of 4 feet to 20 feet.

13. The exterior siding system according to claim 1, wherein each exterior siding article further comprises a coating including a layer of paint, wherein the coating covers at least a front surface of the body.

14. An exterior cladding system comprising:
a building substrate; and
a plurality of exterior cladding articles, wherein each of the exterior cladding articles is formed as a siding plank, a trim plank, or a covering plank for an eave or a soffit, and is attached to the building substrate, wherein each exterior cladding article comprises an extruded body having a thickness in a range from ⅛ inch to 1 inch and composed of a polymer matrix composite material comprising:
a polyurethane matrix; and
inorganic filler substantially dispersed throughout the composite material and present in a range from 45% to 85% by weight of the composite material, the inorganic filler including:
a first substance present in the inorganic filler in an amount of at least 75 wt % of the inorganic filler, the first substance being selected from the group consisting of calcium carbonate, sand, talc, kaolin clay, dolomite, feldspar and mica and any mixtures thereof, and
an iron oxide in a range from 0.5% to 7% by weight of the inorganic filler.

15. The exterior cladding system according to claim 14, wherein the amount of iron oxide, by weight, in the inorganic filler is in a range from 1% to 6%.

16. The exterior cladding system according to claim 14, wherein the iron oxide includes at least one of $Fe_3O_4$ and $Fe_2O_3$.

17. The exterior cladding system according to claim 14, wherein the amount of the first substance, by weight, in the inorganic filler is at least 90%.

18. The exterior cladding system according to claim 14, wherein the first substance is selected from the group consisting of calcium carbonate, sand, talc, and kaolin clay.

19. The exterior cladding system according to claim 14, wherein the first substance is calcium carbonate.

20. The exterior cladding system according to claim 14, wherein
the amount of iron oxide, by weight, in the inorganic filler is in a range from 1% to 6%;
the iron oxide includes at least one of $Fe_3O_4$ and $Fe_2O_3$,
the amount of the first substance, by weight, in the inorganic filler is at least 90%; and
the first substance is selected from the group consisting of calcium carbonate, sand, talc, and kaolin clay.

\* \* \* \* \*